(12) United States Patent
Dubey et al.

(10) Patent No.: US 10,211,621 B2
(45) Date of Patent: Feb. 19, 2019

(54) FAIL-SAFE FOR SHARED PIN

(71) Applicant: Texas Instruments Incorporated, Dallas, TX (US)

(72) Inventors: Sumit Dubey, Bangalore (IN); Nitin Agarwal, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 321 days.

(21) Appl. No.: 15/087,089

(22) Filed: Mar. 31, 2016

(65) Prior Publication Data

US 2017/0288391 A1   Oct. 5, 2017

(51) Int. Cl.
*H02H 3/20* (2006.01)
(52) U.S. Cl.
CPC ..................... *H02H 3/20* (2013.01)
(58) Field of Classification Search
CPC .......................................... H02H 3/20
See application file for complete search history.

(56) References Cited

U.S. PATENT DOCUMENTS

| | | | |
|---|---|---|---|
| 5,404,359 A | | 4/1995 | Gillenwater et al. |
| 6,147,538 A | * | 11/2000 | Andresen ............. H01L 27/027 |
| | | | 327/309 |
| 6,304,112 B1 | | 10/2001 | Annema et al. |
| 6,320,406 B1 | | 11/2001 | Morgan et al. |
| 6,850,396 B1 | * | 2/2005 | Clemo .................. H02H 3/087 |
| | | | 361/100 |
| 7,656,185 B2 | | 2/2010 | Kim et al. |
| 2013/0182353 A1 | * | 7/2013 | Schieke .................... G06F 1/30 |
| | | | 361/18 |
| 2015/0008973 A1 | * | 1/2015 | Fukuta ................ H03K 17/168 |
| | | | 327/379 |

OTHER PUBLICATIONS

International Search Report for PCT/US2017/025418 dated Aug. 14, 2017.

* cited by examiner

*Primary Examiner* — Scott Bauer
(74) *Attorney, Agent, or Firm* — Michelle F. Murray; Charles A. Brill; Frank D. Cimino

(57) ABSTRACT

An integrated circuit (IC) provides an improved fail-safe signal to a circuit sharing a fail-safe pin at which the voltage can be greater than the voltage of an upper rail. The IC includes a first circuit segment that receives a first fail-safe signal and a first power-down signal and provides an intermediate signal, wherein the first fail-safe signal indicates when the voltage at the fail-safe pin is greater than the upper rail and the first power-down signal indicates when the module is powered down, and a second circuit segment connected to receive the intermediate signal and to provide the improved fail-safe signal to the module.

11 Claims, 3 Drawing Sheets

FAIL-SAFE FOR SHARED PIN

FIELD OF THE DISCLOSURE

Disclosed embodiments relate generally to the field of fail-safe circuit. More particularly, and not by way of any limitation, the present disclosure is directed to a fail-safe circuit for use with a shared pin.

BACKGROUND

A node or pin in a system is a fail-safe pin when it is possible for the voltage at the pin to be greater than $V_{DD}$, a condition that should be protected against. To manage this problem, a fail-safe circuit generates a fail-safe signal to prevent the flow of current towards $V_{DD}$. When a fail-safe pin is shared by multiple circuit blocks, undesired interactions can occur in certain situations. Applicants have noted that a circuit block that is in power-down mode can still affect settling time in other blocks sharing the same fail-safe pin. It is desirable that a block in power-down mode have no effect on blocks that share a fail-safe pin.

SUMMARY

A module is disclosed that modifies an existing fail-safe signal so that the modified fail-safe signal is asserted both when the voltage at the fail-safe pin is greater than $V_{DD}$ and also when the circuit block that receives the modified signal is in power-down mode. The modified fail-safe signal prevents switching of the fail-safe signal during power-down mode, eliminating the interference with other circuit blocks.

In one aspect, an embodiment of an integrated circuit is disclosed. The integrated circuit includes a first circuit segment that receives a first fail-safe signal and a first power-down signal and provides an intermediate signal, wherein the first fail-safe signal indicates when the voltage at the fail-safe pin is greater than the upper rail and the first power-down signal indicates when the module is powered down; and a second circuit segment connected to receive the intermediate signal and to provide the improved fail-safe signal to the module.

In another aspect, an embodiment of an integrated circuit is disclosed. The an integrated circuit includes a plurality of circuit blocks that share a common pin, wherein a voltage at the common pin can be greater than a voltage of an upper rail; a first circuit block of the plurality of circuit blocks, the first circuit block comprising a PMOS transistor coupled in series between the common pin and the upper rail; and a fail-safe circuit that receives the voltage at the common pin and a power-down signal for the first circuit block and provides a first fail-safe signal that turns off the PMOS transistor whenever the voltage at the common pin is greater than the upper rail and also when the first circuit block is in power-down mode.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, the term "couple" or "coupled" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

Figure 1A:
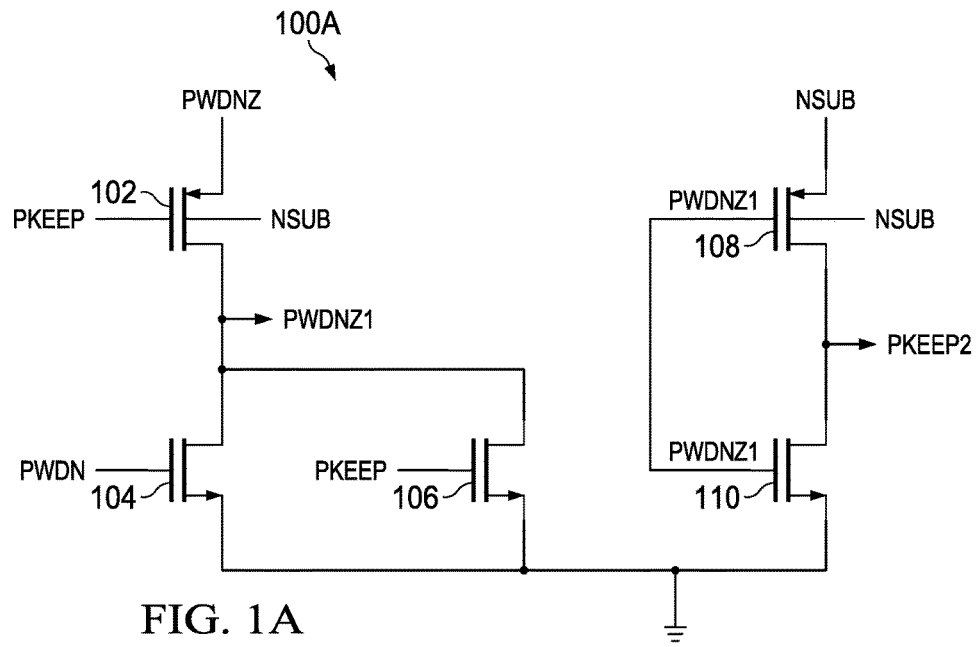
Figure 1B:
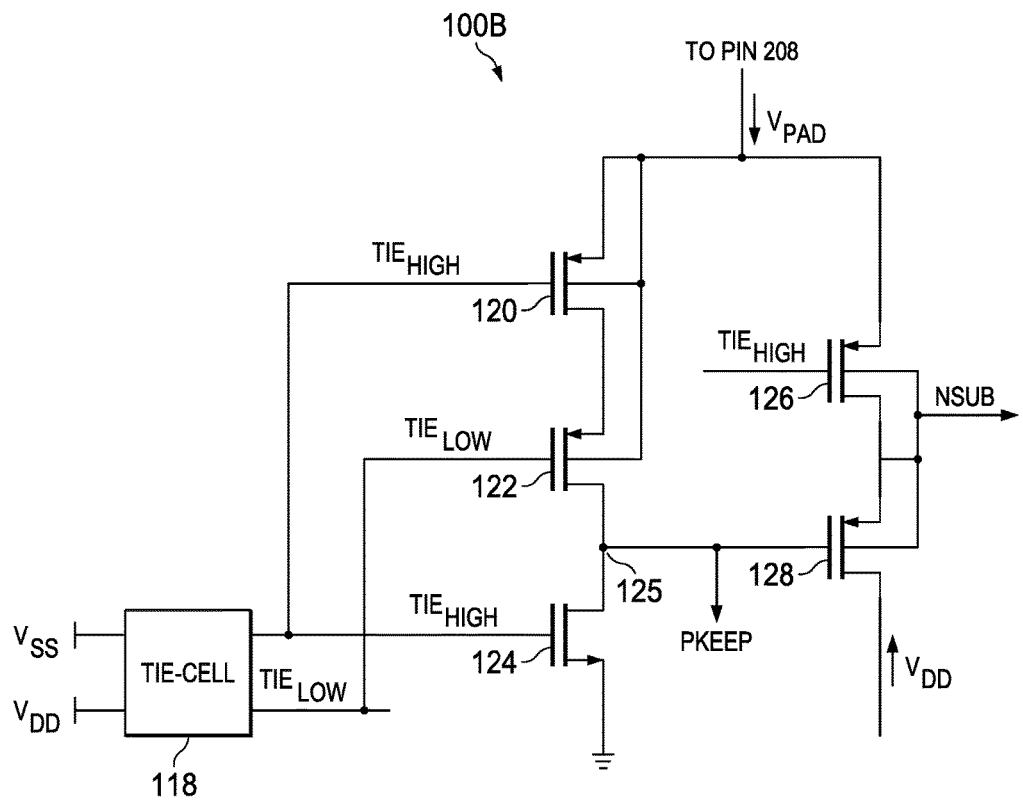
Figure 2:
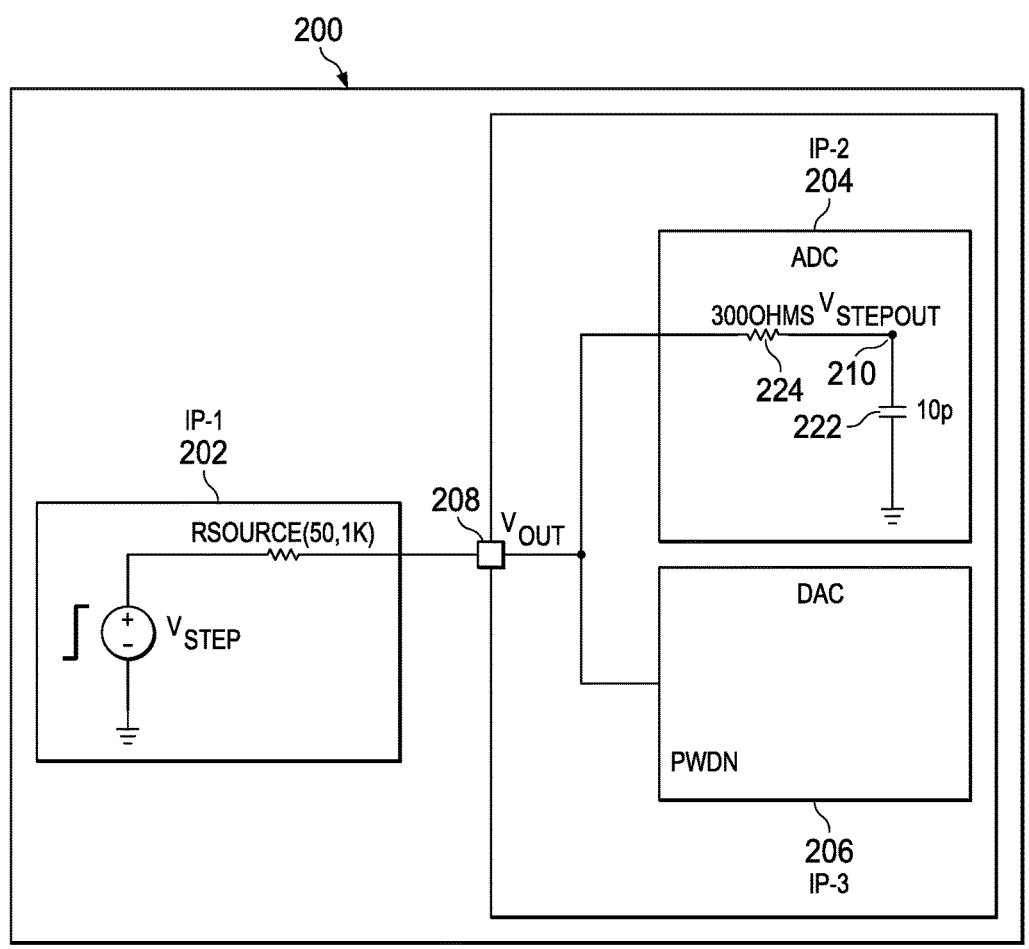
Figure 3A:
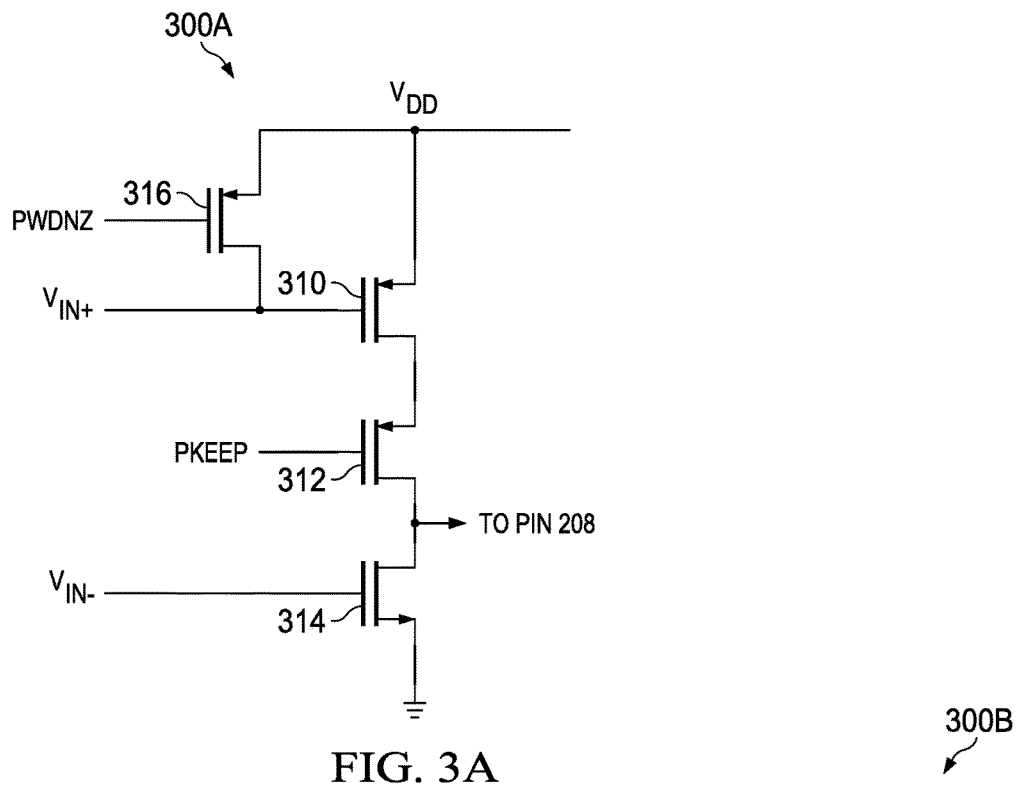

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

FIG. 1A depicts a circuit for modifying a fail-safe signal to provide an improved fail-safe signal according to an embodiment of the disclosure;

FIG. 1B depicts a circuit for providing a fail-safe signal when the voltage on a given pad is greater than the upper rail according an embodiment of the disclosure;

FIG. 2 depicts a system having multiple blocks that share a fail-safe pin;

FIG. 3A depicts a circuit section that utilizes a fail-safe signal; and

Figure 3B:
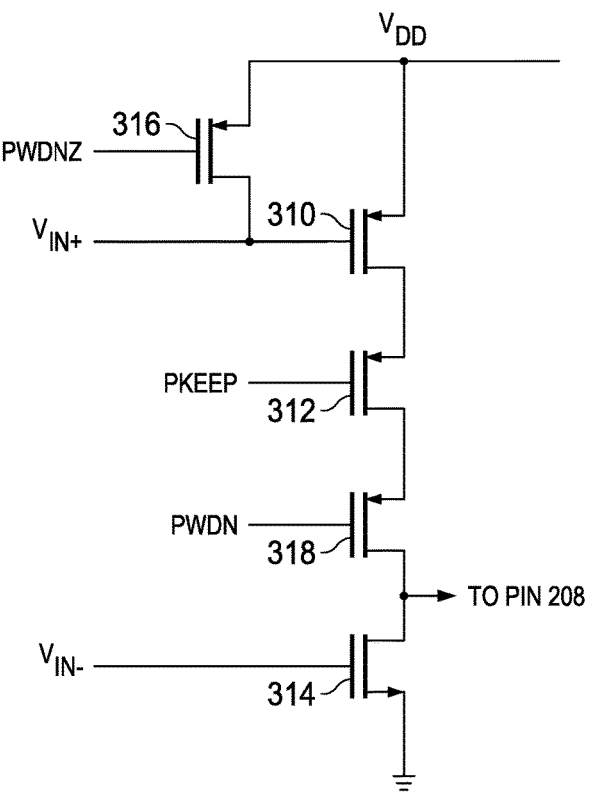

FIG. 3B depicts a circuit section having an improvement to the use of a fail-safe signal.

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The following circuits are explained with reference to Complementary Metal Oxide Semiconductor (CMOS) transistors, which include n-type MOS (NMOS) and p-type MOS (PMOS). One skilled in the art will understand that the names (CMOS, PMOS, NMOS) are hold-overs from the days when these transistors were made using metal gates and oxide passivation layers, although other materials can be used instead of these specific materials. Additionally, other types of transistors can also be used, such as junction gate field-effect transistor (JFET), bipolar junction transistors, etc.

Referring first to FIG. 2, the problem encountered in blocks sharing a fail-safe pin is explained in greater detail. System 200, which may for example be a System On Chip (SOC), discloses three IPs: IP-1 202, IP-2 204 and IP-3 206; the three IPs share a Fail-Safe Pin 208 that has a voltage $V_{OUT}$. Herein, an IP refers to an internal circuitry core or block of circuitry within the overall system; only portions of each IP are illustrated for simplicity. Similarly, a pin is a node that provides input or output to an IP. IP1 202 supplies an alternating current (AC) having a voltage $V_{STEP}$ to Fail-Safe Pin 208 through Resistor RSOURCE. IP2 204 contains Resistor 224 and Capacitor 222 and a Node 210, which has a voltage $V_{STEPOUT}$, between Resistor 224 and Capacitor 222. A second terminal of Capacitor 222 is coupled to ground. IP-3 206 shares Fail-Safe Pin 208 with IP2 204 and in this example, contains a Digital-to-Analog Converter (DAC), the details of which are not shown. IP-3 206 has a power-down mode in which the IP is not active. Applicants have noted that when IP3 206 is in power-down mode, this IP still affects the settling time at Node 210 in IP2 whenever $V_{OUT}$ goes higher than $V_{DD}$. It will be understood that the configuration given in this figure is for illustration only and is not intended as a limitation on the circuits that can use the disclosed modified fail-safe signal.

To understand how this effect occurs, we refer to FIG. 3A, which discloses one example of a fail-safe switch in use. Circuit 300A provides an example section of circuit that may be a part of an IP coupled to the shared Fail-Safe Pin 208. In this example, PMOS Transistor 310 has a source coupled to the upper rail, e.g., $V_{DD}$, while NMOS Transistor 314 has a source coupled to the lower rail, e.g., ground, with a connection to Fail-Safe Pin 208 being provided between the drain of PMOS Transistor 310 and the drain of NMOS Transistor 314. As can be seen in this figure, PMOS Transistor 310 and NMOS Transistor 314 have their respective gates controlled by differential signals $V_{IN+}$ and $V_{IN-}$. Given that the voltage $V_{OUT}$ at Fail-Safe Pin 208 may be greater than the upper rail at times, PMOS Transistor 312 is coupled between the drain of PMOS Transistor 310 and Fail-Safe Pin 208, with the gate of PMOS Transistor 312 being controlled by a signal PKEEP. When the voltage $V_{OUT}$ on Fail-Safe Pin 208 is less than or equal to $V_{DD}$, i.e., the circuit is able to operate normally, PKEEP is equal to the lower rail, e.g., ground. When the voltage $V_{OUT}$ becomes greater than $V_{DD}$, PKEEP is driven to a value equal to $V_{OUT}$, as will be explained below, turning off Transistor 312. In this manner, PMOS Transistor 312 prevents a direct connection of Fail-Safe Pin 208 to the drain of PMOS Transistor 310 when $V_{OUT}$ is greater than $V_{DD}$. Circuit 300A can be placed in a power-down mode by Signal PWDNZ, which is high during normal operation and low when the IP is in power-down mode. Transistor 316 is coupled between the upper rail and the gate of Transistor 310 such that when PWDNZ goes low during power-down, the gate of PMOS Transistor 310 is pulled toward the upper rail, turning off PMOS Transistor 310.

If we assume for a moment that Circuit 300A is part of IP-3, Applicants have noted that the switching of PMOS Transistor 312, when $V_{OUT}$ becomes greater than $V_{DD}$, affects the settling time of voltage $V_{STEPOUT}$ at Node 210 in IP-2 204, even when IP-3 206 is in power-down mode. As noted earlier, it is desirable that when IP-3 is in power-down mode, IP-3 does not affect other IPs that share Fail-Safe Pin 208. One method of managing this issue is shown in FIG. 3B.

Circuit 300B is identical to Circuit 300A except for the addition of PMOS Transistor 318 between the drain of PMOS Transistor 312 and Fail-Safe Pin 208. Signal PWDN, which controls the gate of PMOS Transistor 318, is the inverse of PWDNZ and thus is high whenever the module is in power-down mode. This turns off PMOS Transistor 318 during power-down, isolating Fail-Safe Pin 208 from switching at PMOS Transistor 312 and preventing an effect on settling at Node 210. However, the addition of PMOS Transistor 318 introduces additional problems. PMOS Transistor 318 would need to be large, as the switch size required will be high and the addition of another PMOS Transistor will increase the voltage drop, making the circuit less efficient.

Rather than adding a new switch, at least one embodiment of the disclosure modifies the fail-safe signal PKEEP such that the modified fail-safe signal will be high whenever $V_{OUT}$ is greater than $V_{DD}$ and also when the IP receiving PKEEP is in power-down mode, thus isolating Fail-Safe Pin 208 from the drain of PMOS Transistor 310 during these times. An embodiment that creates a modified PKEEP signal will be discussed, first looking at FIG. 1B, which discloses a circuit for providing a fail-safe signal, and then turning to FIG. 1A, which discloses an embodiment in which the original fail-safe signal is modified to prevent issues during power-off.

In FIG. 1B, Circuit 100B receives voltage rails $V_{DD}$ and $V_{SS}$ and voltage $V_{PAD}$ from Shared Pin 208; Circuit 100B provides two outputs: PKEEP, which is the original fail-safe signal, and NSUB, which as we will see is the greater of the value of $V_{PAD}$ and $V_{DD}$. In the embodiment shown, $V_{DD}$ and $V_{SS}$ are received at Tie-Cell 118. For smaller technologies, e.g., 90 nanometer and smaller, the fixed inputs cannot be implemented by directly connecting the gate inputs to the power rails, as the high voltages and currents received from the rails are able to destroy the gates. Tie-cell 118 can connect additional resistors between the gate inputs and the rails to protect the gates. For purposes of this discussion, the signals $Tie_{High}$ and $Tie_{Low}$, which are output from Tie-Cell 118, are considered equivalent to $V_{DD}$ and $V_{SS}$ respectively; however, it will be understood that the values of $Tie_{High}$ and $Tie_{Low}$ can be adjusted to accommodate smaller technologies or different reference voltages. References in this disclosure to ground, GND, are a reference to the local ground $V_{SS}$.

PMOS Transistor 120, PMOS Transistor 122 and NMOS Transistor 124 are coupled in series between Shared Pin 208, and the lower rail. The gates of PMOS Transistor 120 and NMOS Transistor 124 are each controlled by $Tie_{High}$ and the gate PMOS Transistor 122 is controlled by $Tie_{Low}$. The output PKEEP is taken from a point between the drains of PMOS Transistor 122 and NMOS Transistor 124. PMOS Transistor 126 and PMOS Transistor 128 are also coupled in series between $V_{PAD}$ and $V_{DD}$. The gate of PMOS Transistor 126 is controlled by $Tie_{High}$ and the gate of PMOS Transistor 128 is controlled by the signal, PKEEP. The signal NSUB is taken from a point between PMOS Transistor 126 and PMOS Transistor 128. It can be noted also that the substrates of PMOS Transistors 120 and 122 are coupled to a point between PMOS 126 and PMOS 128 and thus are also connected to NSUB.

The operation of Circuit 100B is as follows. When $V_{PAD}$ is greater than $V_{DD}$, PMOS Transistors 120 and 122 turn on due to their negative gate-source voltage, $V_{is}$, which pulls Node 125 towards $V_{PAD}$. NMOS Transistor 124 will remain on; however, this transistor has been made weaker than PMOS Transistor 120, such that NMOS Transistor 124 is overpowered when PMOS Transistor 120 is on. PKEEP then has a value of $V_{PAD}$, which turns off PMOS Transistor 128; PMOS Transistor 126 is also on due to its negative $V_{is}$, so that NSUB has a value of $V_{PAD}$.

When $V_{PAD}$ is less than $V_{DD}$, $V_{GS}$ at PMOS Transistor 120 is positive, so that PMOS Transistor 120 is turned off. NMOS Transistor 124 is on, pulling Node 125 to the lower rail, e.g., GND, giving PKEEP a value of zero. Since $V_{PAD}$ is less than $V_{DD}$, PMOS transistor 126 is off and PMOS transistor 128 is on and NSUB will be equal to $V_{DD}$.

As discussed above, Circuit 100B provides the fail-safe signal PKEEP, which is equal to the voltage $V_{PAD}$ at Fail-Safe Pin 208 whenever $V_{PAD}$ is greater than $V_{DD}$ and is equal to GND when $V_{PAD}$ is less than $V_{DD}$. However, we now want the transistor controlled by PKEEP to also turn off when its circuit is in power-down mode. That is, we would like the modified fail-safe signal PKEEP2 to have the values shown in Table 1.

TABLE 1

| Power-Down | $V_{PAD}$ VALUE | PKEEP2 |
|---|---|---|
| PWDN = 0 | $V_{PAD} < V_{DD}$ | PKEEP2 = GND |
| PWDN = 0 | $V_{PAD} > V_{DD}$ | PKEEP2 = $V_{PAD}$ |
| PWDN = 1 | $V_{PAD} < V_{DD}$ | PKEEP2 = $V_{DD}$ |
| PWDN = 1 | $V_{PAD} > V_{DD}$ | PKEEP2 = $V_{PAD}$ |

Referring now to FIG. 1A, Circuit 100A discloses a circuit to provide the desired values for modified fail-safe signal PKEEP2. Circuit 100A receives inputs PKEEP, PWDN, PWDNZ (the inverse of PWDN), and NSUB and provides a modified fail-safe signal PKEEP2. Circuit 100A includes PMOS Transistor 102 coupled in series with NMOS Transistor 104 between Signal PWDNZ and the lower rail. NMOS Transistor 106 is also coupled in series with PMOS Transistor 102 (between Signal PWDNZ and the lower rail) and in parallel with NMOS Transistor 104. The gates of PMOS Transistor 102 and NMOS Transistor 106 are each controlled by PKEEP and the gate of NMOS Transistor 104 is controlled by PWDN. An intermediate signal PWDNZ1 is taken from a point between the drain of PMOS Transistor 102 and the drains of NMOS Transistors 104, 106 and provided to the gates of PMOS Transistor 108 and NMOS Transistor 110, which are coupled in series between signal NSUB and the lower rail. Modified fail-safe signal PKEEP2 is taken from a point between the drains of PMOS Transistor 108 and NMOS Transistor 110. It will be noted that PMOS Transistors 102, 108 have their substrate coupled to NSUB.

The operation of Circuit 100A will now be described. The four possible situations that can determine the value of modified fail-safe signal PKEEP2 are shown in Table 1, so the operation will be described in the order of that table. In a first situation, $V_{PAD}$ is less than $V_{DD}$ and power-down is not active, so PWDN is equal to zero, PWDNZ is equal to one, and PKEEP is equal to the lower rail, which turns on PMOS Transistor 102 and turns off NMOS Transistor 106. PWDN being zero turns off NMOS 104. With both NMOS Transistor 104 and NMOS Transistor 106 turned off and PMOS Transistor 102 turned on, the value of PWDNZ1 is one. PWDNZ1 then turns off PMOS Transistor 108 and turns on NMOS Transistor 110, so that PKEEP2 is equal to the lower rail.

In the second situation, $V_{PAD}$ is greater than $V_{DD}$ and Circuit 200A is not in power down mode. As seen previously, both PKEEP and NSUB are equal to $V_{PAD}$, PWDN is equal to zero and PWDNZ1 is equal to one. At PMOS Transistor 102, the gate-source voltage $V_{GS}$ is positive, so PMOS Transistor 102 is off. NMOS Transistor 104 is turned off and NMOS Transistor 106 is turned on, setting PWDNZ1 to GND. PWDNZ1 then turns on PMOS Transistor 108 and turns off NMOS Transistor 110 so that PKEEP2 is equal to NSUB, which in this instance is equal to $V_{PAD}$.

In the third case, $V_{PAD}$ is less than $V_{DD}$ and Circuit 200A is in power down mode. PKEEP is equal to ground, PWDN is equal to one and PWDNZ is equal to zero. PMOS Transistor 102 will not turn on, since the gate-source voltage $V_{GS}$ is zero; NMOS Transistor 106 is turned off but NMOS Transistor 104 turns on, pulling the value of PWDNZ1 to the lower rail, i.e., a value of zero. PWDNZ1 will turn off NMOS Transistor 110 and will turn on PMOS Transistor 108, so that PKEEP2 has a value equal to NSUB. Since $V_{PAD}$ is less than $V_{DD}$, both NSUB and PKEEP2 have a value of $V_{DD}$.

In the fourth case, $V_{PAD}$ is greater than $V_{DD}$ and Circuit 300A is in power-down mode. PKEEP and NSUB are equal to $V_{PAD}$, PWDN is equal to one and PWDNZ1 is equal to zero. PMOS Transistor 102 will not turn on due to a positive $V_{GS}$, NMOS Transistor 104 is on and NMOS Transistor 106 is on, so PWDNZ1 is equal to GND. PWDNZ1 will then turn on PMOS Transistor 108 and turn off NMOS Transistor 110, so that PKEEP2 is set to equal NSUB, which is equal to $V_{PAD}$. The new modified fail-safe signal will thus fulfill the requirements set in Table 1.

The disclosed embodiment provides a low area solution to the problem of fail-safe shared pin settling time issue between different blocks. A large switch, such as the additional switch shown in FIG. 3B, would impact the settling time of output by the parasitic capacitors, but using the disclosed embodiment does not require a large switch and won't significantly impact output settling time of all IPs sharing the same pin.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An integrated circuit (IC) for providing an improved fail-safe signal to a circuit sharing a fail-safe pin at which a voltage can be greater than a voltage of an upper rail, the IC comprising:
    a first circuit segment that receives a first fail-safe signal and a first power-down signal and provides an intermediate signal, wherein the first fail-safe signal indicates when the voltage at the fail-safe pin is greater than the upper rail and the first power-down signal indicates when a module is powered down; and
    a second circuit segment connected to receive the intermediate signal and to provide the improved fail-safe signal to the module.

2. The IC as recited in claim 1 wherein the first circuit segment is coupled between a second power-down signal that is the inverse of the first power-down signal and a lower rail.

3. The IC as recited in claim 2 wherein the second circuit segment is coupled between a high signal that is the higher of the upper rail and the voltage at the fail-safe pin.

4. The IC as recited in claim 3 wherein the first circuit segment comprises:
    a first PMOS transistor coupled in series with a first NMOS transistor;
    a second NMOS transistor coupled in parallel with the first NMOS transistor; and further wherein the first fail-safe signal is coupled to drive a gate of the first PMOS transistor and a gate of the second NMOS transistor and the second power-down signal is coupled to drive a gate of the first NMOS transistor.

5. The IC as recited in claim 4, wherein the second circuit segment comprises a second PMOS transistor coupled in series with a third NMOS transistor, the intermediate signal being coupled to drive a gate of the second PMOS transistor and a gate of the third NMOS transistor and the improved fail-safe signal being taken from a point between the second PMOS transistor and the third NMOS transistor.

6. The IC as recited in claim 5 wherein a body of the first PMOS transistor and a body of the second PMOS transistor are coupled to the high signal.

7. The IC as recited in claim 6 wherein the first fail-safe signal is provided by a third circuit segment coupled between the fail-safe pin and the lower rail.

8. The IC as recited in claim 7 wherein the third circuit segment comprises a third and a fourth PMOS transistor coupled in series with a fourth NMOS transistor, a gate of the third PMOS transistor and a gate of the fourth NMOS transistor being controlled by the upper rail and a gate of the fourth PMOS transistor being controlled by the lower rail and further wherein the body of the third PMOS transistor and the body of the fourth PMOS transistor are coupled to the high signal.

9. The IC chip as recited in claim 8 wherein the high signal is provided by a fourth circuit segment coupled between the fail-safe pin and the upper rail.

10. The IC chip as recited in claim 9 wherein the fourth circuit segment comprises a fifth PMOS transistor coupled in series with a fifth NMOS transistor, the gate of the fifth PMOS transistor being controlled by the upper rail and the gate of the fifth NMOS transistor being controlled by the first fail-safe signal, the high signal being taken at a point between the fifth PMOS transistor and the fifth NMOS transistor and further wherein a substrate of the fifth NMOS transistor and the fifth PMOS transistor are coupled to the high signal.

11. An integrated circuit (IC) chip comprising:
    a plurality of circuit blocks that share a common pin, wherein a voltage at the common pin can be greater than a voltage of an upper rail;
    a first circuit block of the plurality of circuit blocks, the first circuit block comprising a PMOS transistor coupled in series between the common pin and the upper rail; and
    a fail-safe circuit that receives the voltage at the common pin and a power-down signal for the first circuit block and provides a first fail-safe signal that turns off the PMOS transistor when the voltage at the common pin is greater than the upper rail and also when the first circuit block is in power-down mode.

* * * * *